(12) United States Patent
Jurasek

(10) Patent No.: US 8,067,978 B2
(45) Date of Patent: Nov. 29, 2011

(54) DYNAMIC CURRENT SUPPLYING PUMP

(75) Inventor: Ryan Andrew Jurasek, S. Burlington, VT (US)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 126 days.

(21) Appl. No.: 12/577,726

(22) Filed: Oct. 13, 2009

(65) Prior Publication Data

US 2011/0084742 A1    Apr. 14, 2011

(51) Int. Cl.
*H02M 3/16* (2006.01)
*G05F 1/46* (2006.01)

(52) U.S. Cl. .......................... 327/536; 363/59

(58) Field of Classification Search ................. None
See application file for complete search history.

(56) References Cited

U.S. PATENT DOCUMENTS

| | | | |
|---|---|---|---|
| 6,278,317 B1 * | 8/2001 | Hsu et al. ...................... | 327/536 |
| 6,330,173 B1 | 12/2001 | Yamasaki et al. | |
| 6,853,567 B2 * | 2/2005 | Kwon ............................. | 363/60 |
| 7,710,193 B2 * | 5/2010 | Kim et al. ...................... | 327/536 |
| 7,898,317 B2 * | 3/2011 | Choi ............................... | 327/535 |
| 2006/0267901 A1 | 11/2006 | Maekawa | |
| 2009/0315598 A1 * | 12/2009 | Namekawa ................... | 327/157 |

* cited by examiner

*Primary Examiner* — Lincoln Donovan
*Assistant Examiner* — Terry L Englund
(74) *Attorney, Agent, or Firm* — Winston Hsu; Scott Margo

(57) ABSTRACT

A pump system that can dynamically increase its current capability includes: a pump circuit, for producing an output voltage; an oscillator, for driving the pump circuit to pump at a particular frequency according to a pump enable signal; a limiter, coupled to both the oscillator and the output voltage fed back from the pump circuit, for generating the pump enable signal to the oscillator according to the output voltage feedback signal; and an edge timer, coupled to both the oscillator and the pump enable signal, for driving the oscillator to operate at an increased frequency according to a threshold parameter of the pump enable signal.

8 Claims, 3 Drawing Sheets

DYNAMIC CURRENT SUPPLYING PUMP

BACKGROUND OF THE INVENTION

1. Field of the Invention

This invention relates to current supplying pumps, and more particularly, to current supplying pumps that can dynamically change their current capability according to requirements.

2. Description of the Prior Art

Current supply pumps are standard circuits in the electronics field. They are used to supply and control an output voltage by enabling a pump, and utilizing an oscillator to control the periodicity of pump cycles. The oscillator controls the pump to pump at a desired frequency for producing a certain output voltage, and when the output voltage is too high, the pump will be disabled. These operations are controlled by a feedback mechanism.

Please refer to FIG. 1. FIG. 1 is a diagram of a conventional pump circuit 100. The pump circuit 100 comprises a limiter circuit 110, an oscillator 120 and a pump 130. The pump 130 produces an output voltage which is fed back to the limiter 110. The limiter 110 selectively outputs a pump enable signal to the oscillator 120 according to the feedback voltage. When the output of the pump 130 is too low, the limiter 110 will enable the pump signal, thereby enabling the oscillator 120, which will then cause the pump 130 to pump the output voltage higher. When the limiter 110 determines that the output voltage is high enough, the limiter 110 will disable the oscillator 120, so that the pump 130 will not pump. The oscillator 120 controls the output voltage of the pump 130 by setting the period of pump cycles.

There is therefore a correlation between the size of the output voltage and efficiency. If the current demand is high, this means that the oscillator 120 must have a higher periodicity of pump cycles. This allows the pump 130 to generate more current, but also reduces efficiency. If the oscillator 120 controls the pump 130 to pump with a reduced number of pump cycles, the efficiency increases, but there will be a cap on the amount of current the pump 130 can produce.

SUMMARY OF THE INVENTION

It is therefore an objective of the present invention to provide a pump circuit that can overcome these problems.

A pump system that can dynamically increase its current capability according to an exemplary embodiment of the present invention includes: a pump circuit, for producing an output voltage; an oscillator, for driving the pump circuit to pump at a particular frequency according to a pump enable signal; a limiter, coupled to both the oscillator and the output voltage fed back from the pump circuit, for generating the pump enable signal to the oscillator according to the output voltage feedback signal; and an edge timer, coupled to both the oscillator and the pump enable signal, for driving the oscillator to operate at an increased frequency according to a threshold parameter of the pump enable signal.

A related method comprising: providing a pump circuit for producing an output voltage; driving the pump circuit to pump at a particular frequency according to a pump enable signal; generating the pump enable signal according to a feedback signal of the output voltage; and driving the pump circuit to pump at an increased frequency according to a threshold parameter of the pump enable signal.

These and other objectives of the present invention will no doubt become obvious to those of ordinary skill in the art after reading the following detailed description of the preferred embodiment that is illustrated in the various figures and drawings.

DETAILED DESCRIPTION

The present invention therefore provides means and circuitry for dynamically changing an oscillator frequency according to current vs. efficiency needs. This allows the pump circuit of the present invention to accurately generate a desired output voltage.

Figure 1:
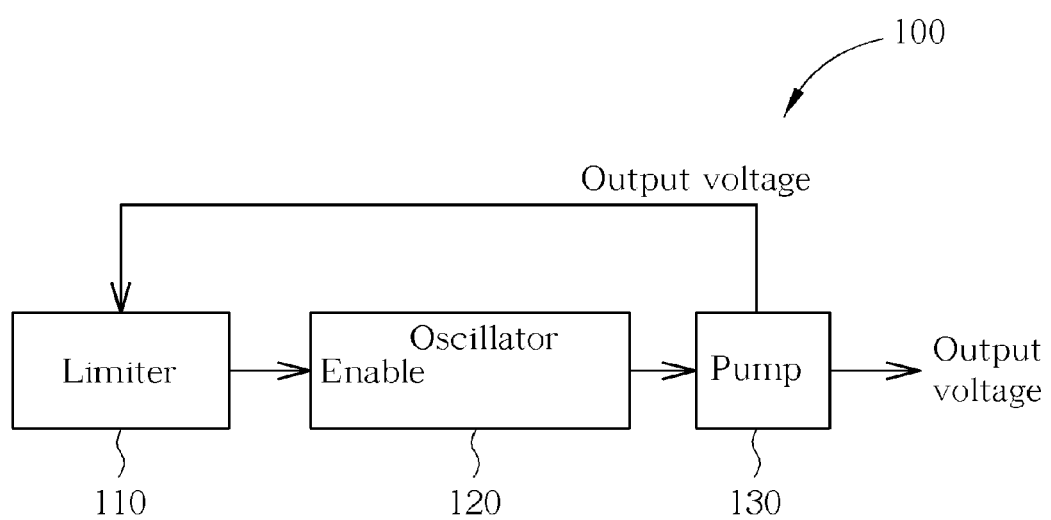
FIG. 1 is a diagram of a conventional pump circuit.
Figure 2:
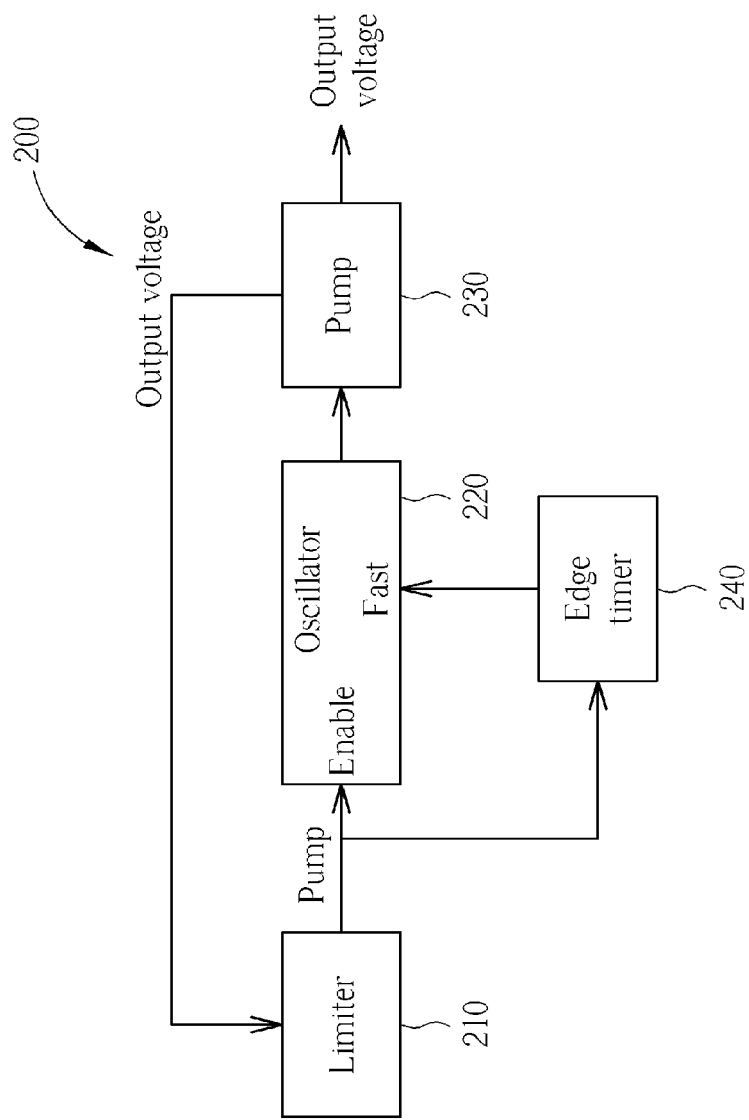
FIG. 2 is a diagram of a pump circuit according to an exemplary embodiment of the present invention.

Please refer to FIG. 2. FIG. 2 is a diagram of a pump circuit 200 according to an exemplary embodiment of the present invention. As seen in the diagram, the pump circuit 200 comprises the conventional limiter 210, oscillator 220 and pump 230, but also comprises an edge timer 240, coupled to both the oscillator 220 and the pump enable signal.

The edge timer 240 is used to determine whether the frequency of the oscillator 220 needs to be further increased or not. The pump enable signal input to the edge timer 240 allows the edge timer 240 to determine a length of time the pump enable signal has been high. If the pump enable signal has been high for a predetermined amount of time, i.e. the pump 230 has not yet reached a maximum output voltage, then the edge timer 240 will enable the oscillator 220 to pump at a higher periodicity. This is particularly useful when a large current is required in a short period of time, for example when initiating a system. Once the output voltage has been reached, the limiter 210 will disable the pump enable signal (and therefore the oscillator 220 and the edge timer 240), and the pump 230 will stop pumping.

Although efficiency will be decreased, the current capability is increased at a desired time and by a desired amount, without requiring extra circuitry or an increased area. This mechanism can therefore be applied to situations where current capacity is a consideration but efficiency is not. This mechanism is also applicable to situations where some safeguard is required; for example, if it is not desirable to have the pump operating for a long period of time, the edge timer 240 enables the pump 230 to quickly reach a threshold output voltage and then turn off.

It should be noted that various modifications can be made to the above system without departing from the spirit of the invention. The threshold for the edge timer 240 can be dynamically modified, for example. In some situations, it may be desirable to have a very short period of time before the edge timer 240 becomes operational, whereas other situations may require a longer period of time. Similarly, the edge timer 240 can be de-activated for conditions where efficiency is a concern, rather than the amount of current supplied. In such a case, the threshold can be set to infinity, so that the edge timer 240 will never operate to increase the frequency of the oscillator 220. Furthermore, the edge timer 240 can have a set delay time built in, such that the edge timer 240 will not turn on until a certain period of time after the pump enable signal has been output. This allows the pump circuit 200 to be widely used in a variety of applications.

Figure 3:
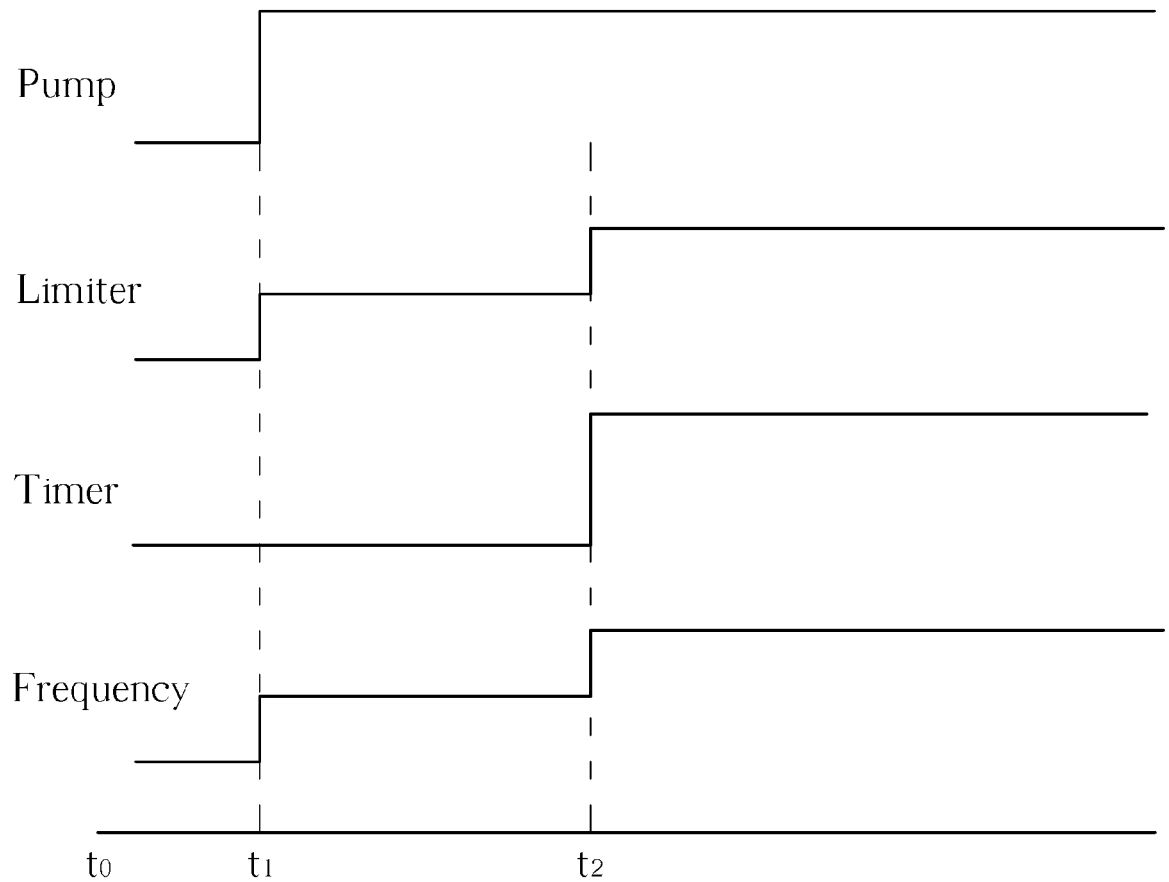
FIG. 3 is a graph comparing the outputs of the pump, limiter, oscillator and edge timer shown in FIG. 2.

Please refer to FIG. 3, which is a diagram of the outputs of all components in the pump circuit 200. As shown in the diagram, at time $t_0$ all signals are low, i.e. the pump is off, the pump enable signal is not operative, and therefore the oscillator is also not operative. At time $t_1$ the pump enable signal is output by the limiter 210. This drives the oscillator 220 to operate at a certain frequency, and therefore the pump 230 is turned on. At time $t_2$ the edge timer 240 detects that the pump enable signal (output of the limiter 210) has been high for the predetermined amount of time. The edge timer 240 therefore determines to drive the oscillator 220 to operate at a higher frequency. The edge timer 240 output therefore goes high, increasing both the frequency of the oscillator 220 and the frequency of the limiter 210 output (which corresponds to the output voltage of the pump 230 and is therefore increased accordingly).

As detailed above, the edge timer 240 may have an inherent delay time built in such that it detects the length of time the pump enable signal is high only after a specific delay time. This is not illustrated in FIG. 3. Furthermore, the edge timer 240 can also drive the oscillator 220 in increments: for example, in a first period where the pump enable signal is high for the predetermined amount of time, the edge timer 240 will drive the oscillator 220 to operate at a higher frequency, and the edge timer 240 will reset; in a second period where the pump enable signal is still high for the predetermined amount of time, the edge timer 240 will drive the oscillator 220 to operate at a still higher frequency. This also falls within the scope of the present invention.

In summary, the present invention provides a pump system that can dynamically increase the periodicity of pump cycles according to a length of time the pump is enabled, therefore providing an increased current in a reduced period of time.

Those skilled in the art will readily observe that numerous modifications and alterations of the device and method may be made while retaining the teachings of the invention.

What is claimed is:

1. A pump system that can dynamically increase its current capability, comprising:
    a pump circuit, for producing an output voltage;
    an oscillator, for driving the pump circuit to pump at a particular frequency according to a pump enable signal only, and for driving the pump circuit to pump at an increased frequency according to the pump enable signal and a timer signal;
    a limiter, coupled to both the oscillator and the output voltage fed back from the pump circuit, for selectively generating the pump enable signal to the oscillator according to the output voltage feedback signal; and
    an edge timer, coupled to both the oscillator and the pump enable signal, for generating the timer signal to the oscillator according to a threshold parameter of the pump enable signal.

2. The pump system of claim 1, wherein the threshold parameter of the pump enable signal is a time parameter corresponding to a specific predetermined period of time after the pump enable signal initially transitions high, and the edge timer starts a count after the pump enable signal initially transitions high and compares the count with the threshold parameter to generate the timer signal.

3. The pump system of claim 2, wherein the specific predetermined period of time can be dynamically set by the edge timer.

4. The pump system of claim 2, wherein the edge timer starts the count at a delay time after the pump enable signal initially transitions high.

5. A method for dynamically increasing the current capability of a pump system, comprising:
    providing a pump circuit for producing an output voltage;
    driving the pump circuit to pump at a particular frequency according to a pump enable signal only, and driving the pump circuit to pump at an increased frequency according to the pump enable signal and a timer signal;
    selectively generating the pump enable signal according to a feedback signal of the output voltage; and
    generating the timer signal according to a threshold parameter of the pump enable signal.

6. The method of claim 5, wherein the threshold parameter of the pump enable signal is a time parameter corresponding to a specific predetermined period of time after the pump enable signal initially transitions high, and the step of generating the timer signal comprises:
    starting a count after the pump enable signal initially transitions high; and
    comparing the count with the threshold parameter to generate the timer signal.

7. The method of claim 6, wherein the specific predetermined period of time can be dynamically set.

8. The method of claim 6, wherein the step of starting a count after the pump enable signal initially transitions high comprises:
    determining the pump enable signal transitions high; and
    starting the count at a delay time after the pump enable signal transitions high.

* * * * *